United States Patent [11] 3,533,367

| [72] | Inventor | Fritz Schuermann<br>Fluchtgasse, Vienna, 9, Austria |
|---|---|---|
| [21] | Appl. No. | 645,090 |
| [22] | Filed | May 23, 1967 |
| [45] | Patented | Oct. 13, 1970 |

[54] DRILL MACHINE FOR SOWING INDIVIDUAL SEEDS
1 Claim, 6 Drawing Figs.

[52] U.S. Cl. ................................................. 111/85, 172/538
[51] Int. Cl. ................................................. A01c 5/06
[50] Field of Search ................................................. 111/52, 53, 59, 62, 68, 69, 70, 71, 73, 77, 78, 79—81, 83—86; 172/538

[56] References Cited
UNITED STATES PATENTS

| 627,830 | 6/1899 | Rodenberger | 111/85X |
| 1,150,537 | 8/1915 | Roby | 111/85X |
| 2,361,083 | 10/1944 | Burnett | 111/59X |
| 2,668,490 | 2/1954 | Oehler et al. | 111/85X |
| 2,738,969 | 3/1956 | Morris et al. | 111/85X |
| 2,968,266 | 1/1961 | Gustafson | 111/85X |
| 3,100,462 | 8/1963 | Steele et al. | 111/77 |
| 3,148,644 | 9/1964 | Keeton | 111/85X |
| 3,154,030 | 10/1964 | Williams | 111/85X |
| 3,251,325 | 5/1966 | Hyland et al. | 111/85X |

FOREIGN PATENTS

| 208,641 | 4/1960 | Austria | 111/85 |
| 622,732 | 6/1961 | Canada | 111/85 |

Primary Examiner—Robert E. Pulfrey
Assistant Examiner—Alan E. Kopecki
Attorney—Theodore Hafner ABSTRACT: The invention consists of a machine for drilling individual seeds in which a drilling device supported on a lever is followed by two coaxial support rollers arranged in front of the drilling device, and spaced from each other so as to be supported on the side walls of the drilled groove while leaving free the center of the groove which receives the seed.

Patented Oct. 13, 1970
3,533,367
Sheet 1 of 2
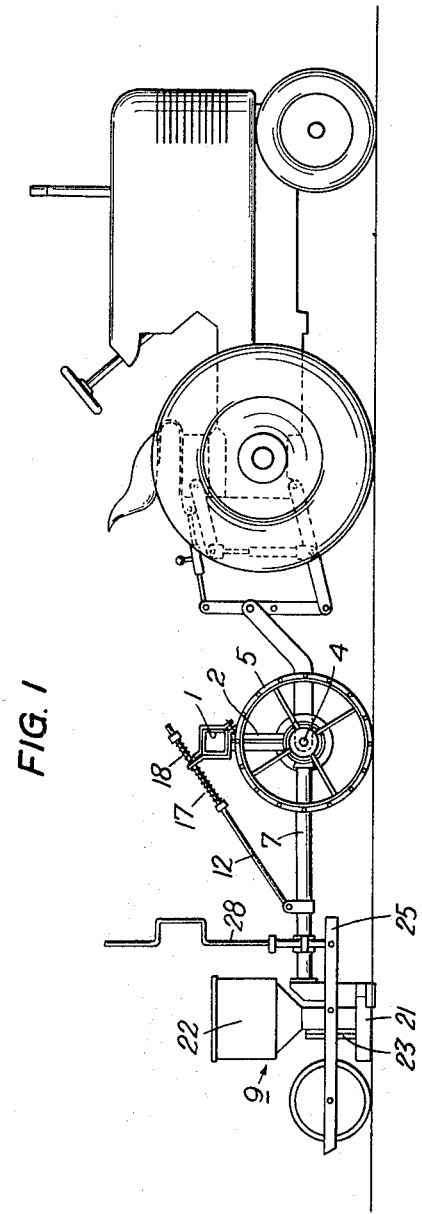
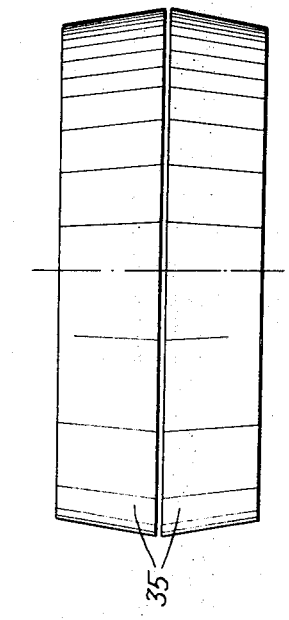
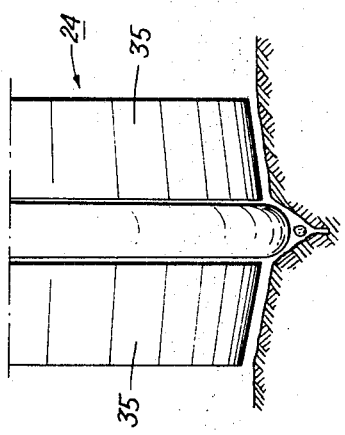
INVENTOR
FRITZ SCHUERMANN

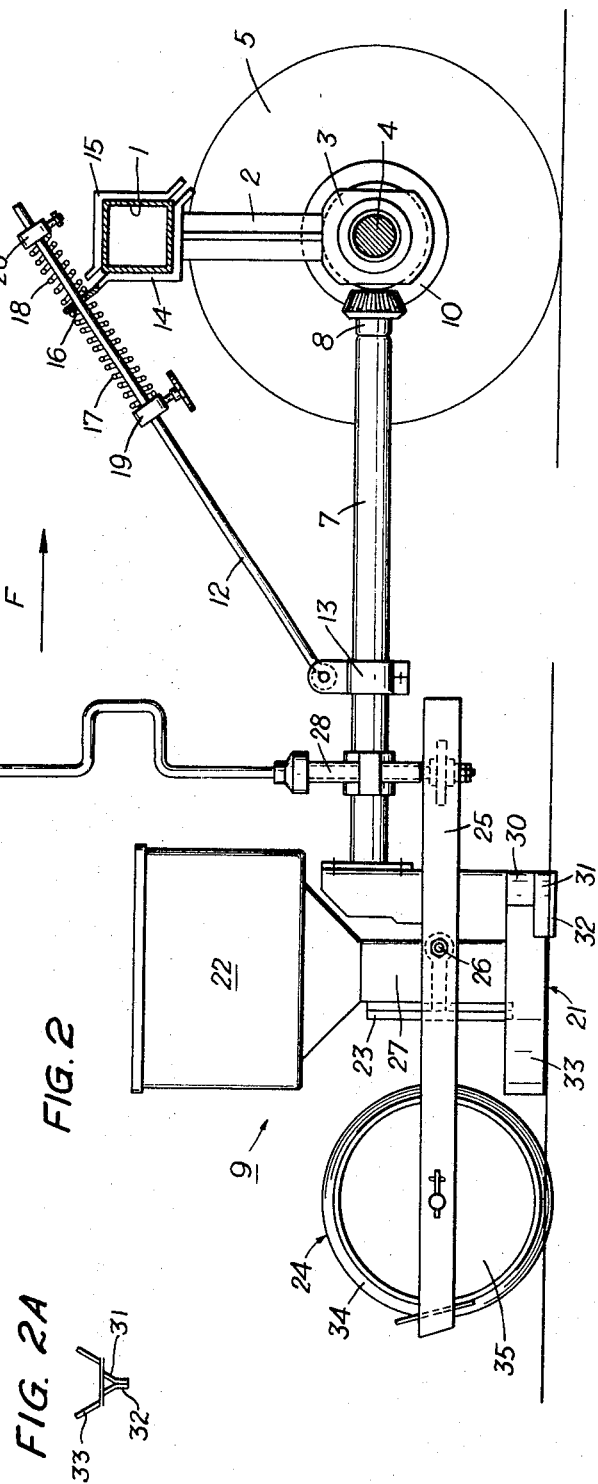
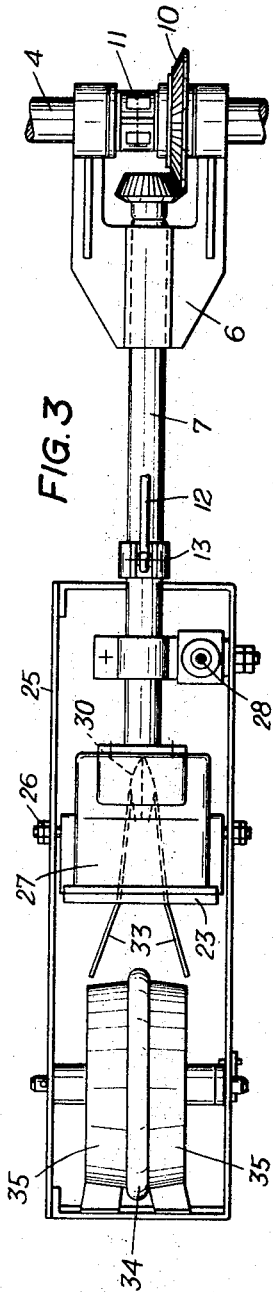
FIG. 2
FIG. 2A
FIG. 3
INVENTOR
FRITZ SCHUERMANN

DRILL MACHINE FOR SOWING INDIVIDUAL SEEDS

This invention relates to a drill machine for sowing individual seeds, which machine has at least one drill device, consisting of a drill wheel provided with cavities arranged below a seed box, and rotatable at right angles to the direction of travel of the drill machine in a rigid housing. This drill device is fastened to the free end of a support tube which is vertically pivoted about the axis of a drive shaft arranged at right angles to the direction of travel and driven by separate wheels. In the main part six such drill devices are arranged next to each other 50 to 60 cm. apart. The support tube of each of the drill devices encloses the drive shaft for the rotation of the drill wheel, which shaft is driven by means of a set of level gears from the drive shaft of the drill machine. By the rotation of the drill wheel the seed grains, which are taken from the seed box by cavities in the drill wheel, are thrown individually downwards into the sowing groove made by a coulter. For the regulation of the depth of the penetration of the coulter in the soil there is provided an adjustably resilient supporting lever which, on one side engages in the support tube and on the other in the machine framework and furthermore an adjustable supporting roll with a screw spindle, which supporting roll determines, by gauging the most uneven soils, the distance of the drill device from the soil and limits the depth of penetration of the coulter in the soil. The support lever also brings about the sure penetration of the coulter even in hard soil, because considerable forces arising from the weight of the machine are exerted by it on the support tube.

An object of the invention is to improve a machine for sowing individual seeds of the above described type. The insertion of the seed into the soil and the depth regulation are to be improved and the seed grains are to be inserted directly into the still damp zone of the soil so that the winter dampness present is used to favour germination.

Hitherto for producing a capillary-permeable soil in that narrow strip which takes the seed grains the pressure exerted on the soil in particular on light or medium soils was only exerted by the dead weight of a follower roller which was attached to the back of the drill device. The pressure exerted was, therefore, mostly too small and the pressed zone too narrow. Furthermore hitherto the seed grains were pushed into the soil at varying depths in soils of varying quality by which an uneven germination was caused.

The follower roller, normally made of cast iron, used hitherto tends particularly on damp soils also to pick up earth. In doing so seed grains are taken by the roller with the earth and are then scattered by the scraper provided, by which the purpose of a single grain drill machine, viz. to insert the seed grains at the same distances along a groove at the same depth in the earth, is not attained. Congestions of seed occur over and over again in the previous types of machines with the result that the intended spacings of the seeds are not maintained. This disadvantage is particularly noticeable on heavy and wet soils.

In order to remove the described disadvantages it is proposed, in accordance with the invention, to provide for the support of the drilling device and also for pressing down the seed grains into the sowing groove a single narrow follower roller the width of which corresponds roughly to the width of the sowing groove. This roller can be used on its own, and have the required effect more particularly if it is provided with a solid or pneumatic rubber tire or the like. In some cases it can be favourable to provide on each side of the narrow follower roller a preferably conical support roll known per se. These lateral support rolls have a smaller diameter than the middle follower roller corresponding to their support function and are fitted preferably with their larger diameter turned to the follower roller.

The roller covered with a rubber tire or the like has a reduced tendency, or none at all, to compress (take along with it) damp earth because self-cleaning is introduced by the continuous deformation of the tire or the like, so that a conventional scraper is superfluous. It is therefore advisable to use the narrow follower roller in accordance with the invention also in borderline cases of soil cohesiveness.

Irregular deep insertion of the seeds is avoided with safety if the narrow follower roller is supported by the mentioned wide rollers of smaller diameters arranged on both sides. The width of the pressed zone is, in this way, increased and with it the capillary perviousness for the water supply in the soil is improved. In cases where the high specific pressure of the narrow follower roller is not required, particularly on heavy soils, where even the rubber roller possibly tends to pick up earth, the middle narrow follower roll can be omitted and only the wider rollers can be used instead of it. These work like a single roller of greater diameter in its middle plane than at the sides. By doing this the direct pressure on the sown seed is decreased, little earth will be taken along and even this little earth will be removed by a scraper without the seeds being taken away.

On quite heavy, wet soils a gap can be left between the two wide rollers, by which the unpressed incrustation on the seed rows can be kept to a minimum and by which the crust is also broken up in the gap so that the subsequent plant gemination can break through the earth more easily.

A specific embodiment of the invention will now be described by way of example with reference to the accompanying drawings, in which:

FIG. 1 shows the arrangement of a drill machine embodying the invention, on a tractor;

FIG. 2 shows diagramatically the essential parts of the drill machine in lateral elevation;

FIG. 2A shows a portion of FIG. 2 taken in cross section;

FIG. 3 is a plan view of the machine in accordance with FIG. 2;

FIG. 4 is a part view of the combined follower rollers seen in the direction A in FIG. 1; and FIG. 5 shows both the lateral follower rollers without the narrow intermediary follower roller.

As shown in the drawings, the drill machine is fastened in a conventional manner to the hydraulic lifting apparatus of a tractor. Its machine frame has a rectangular tube 1 which extends at right angles to the direction of travel F of the machine and rests on bearing brackets 2 which are supported laterally on bearings 3 which surround a drive shaft 4. The drive shaft 4 carries ground wheels 5 (skeleton wheels) running on the soil.

On the shaft 4 there are at distances from each other several forks 6, at the most five or six, which can swing about the shaft 4 in a vertical plane. The forks 6 each take a support tube 7 which extends in the direction of travel and has drive shaft 8 for its own sowing device 9 attached to a flange at the rear end of the support tube 7. Between the bearings of each fork 6 surrounding the shaft 4 is arranged a bevel gear 10 with a locking hub 11 and is joined by frictional contact to the shaft 4 on rotation. The locking hub 11 is pressed against the shaft 4 with only one screw. Undoing of this screw makes it possible for the fork 6 to be moved on the shaft 4 and thus the support tube 7 belonging to it and the drill apparatus 9 attached to it. This means that the distance of the seed rows from each other can be quickly and simply adjusted.

The support tube 7 is supported by means of a supporting lever 12 against the rectangular tube 1 of the machine frame. The support lever 12 flexibly engages at a shackle 13 which surrounds the support pipe 7. In case the fork 6 is moved on the drive shaft 4 the support lever 12 must also be moved. The rectangular tube 1 is provided for this purpose with clamping members 14 and 15 which embrace the rectangular tube 1 with frictional contact. On the clamping member 14 is disposed a tongue with a hole 16 through which the support lever 12 travels. Compression springs 17 and 18 arranged on each side of the tongue and adjusting set bars 19 and 20 working together with them which are adjustable at the support lever 12 render possible the regulation of the pressure exerted from the machine frame onto the support tube 7. If, therefore, a pressure is exerted from the soil onto the drill device, this pressure will be transferred via the support tube 7 the support lever 12 and the spring 17 onto the rectangular tube 1 i.e. therefore onto the machine frame. Conversely, therefore, the drill device is loaded with the pressure exerted by the weight of the machine frame cushioned by the intermediary spring 17, which effects the safe penetration of the coulter 21 of the drilling device 9 into the soil.

The sowing device 9 consists in the normal manner of a seed box 22 and a sowing wheel 23 (not shown) which is, in the known manner provided with recesses, which conduct the seed singularly into the grooves drawn by the drilling coulter.

Instead of the support roller hitherto provided in front of the drilling device 9, a follower roller 24 is provided which is attached to the back of the drilling device 9. A flat steel frame 25 serves to accommodate the freely rotatable rollers and is pivoted about an axis 26 at the housing 27 of the drilling device 9. The frame 25 stretches over the housing 27 forwards, where it is attached to the support tube by means of a screw spindle 28. By turning the screw spindle 28 the frame can be precisely and finely adjusted by which the distance of the drill apparatus 9 from the soil or the penetration of the coulter 21 into the soil is regulated. If the lever 12 resting at the machine frame serves for guaranteeing the penetration of the drill coulter 21 into the soil, the support roll 24 limits on the other hand the depth of penetration. Consequently, the weight works on the machine by means of support springs 17, the lever 12, the support tube 7, the screw spindle 28 or the housing 27 the frame 25 on the followers roller 24. On loose soil the pressure can be reduced by tensioning the opposed spring 18 at the support lever 12. Contrary to the present practice, therefore, not only the weight of the follower roller but also the weight of the whole machine frame acts for the regulable pressing of the seed.

The sowing coulter 21 of the machine in accordance with the invention is built separately and consists of a member 30 closed at its pointed front end and which has below a wedged shaped extension 31 a knife-like extension 32. On the forward part 30 of the drill coulter 2 sheet metal side plates 33 come together laterally and widen out like a wedge. Consequently, the parts 31 and 32 of the coulter part the soil like a wedge and there is formed a wedge-shaped seed groove, in which the grains coming out of the drill wheel fall individually. Since the distance between the drill wheel and and the wedge-shaped groove in the soil is only small lateral deviations are smoothed out when the grains fall and these always fall in the bottom of the groove where they are in an exact straight line. Even a scattering of the individual seeds along the groove is avoided because the grains have no motion in this direction. In this way therefore a uniform spacing in the rows is obtained and also the distance between the rows is kept exact.

The small follower roller 24, which is provided to press the sown seed with a rubber tire 34, acts fully on the wedge-shaped groove. If requisite, a support on both sides of the roller 24 can be provided by wider support rollers 35, which are formed conically and are arranged with a larger diameter to the narrow roller 24. Their main use is as supports. By simply changing the rollers arranged on a knock-out axle and by using distance pieces a gap can be formed, and further, it is also possible to use the rollers in such an arrangement that the rollers form a "concave" roller.

The seed grains are advantageously pressed directly into the still damp zone of the groove by the narrow follower roller so that the winter dampness still present is used to promote germination. The roller provided with the rubber tire 34 no longer tends to press down (take with it) earth and a scraper is, therefore, superfluous. It is, therefore, also advantageous to use the narrow roller on less binding soils. Irregularity of the depth of the sown seeds is more safely avoided if, on both sides of the narrow roller 24, wide conical support rollers 35 are used. By this the width of the pressed damp soil is increased.

In cases where the high specific press-down pressure of the narrow follower roller—for example, on heavy soils—is not required, the narrow roller can be abandoned so that only a controlled pressure can be exerted on the sown seeds by the "convexly" arranged rollers 35. On quite heavy wet soils the arrangement of a gap between the "convexly" arranged rollers 35 is finally indicated by which the formation of incrustations on the unpressed zone between the rollers is less or the incrustation present is broken up, which facilitates the pushing through of the germinating seedlings.

The effect of the coulter 21 completes the work of the drill machine. The small wedge-shaped snout of the drill coulter cuts into the fine crumbly soil without disturbing coarse parts (clods, lumps). The coarse parts of the soil lying above are pushed aside by the lateral sheet metal sides and also at the width of the support roller 35 so that these come fully into effect. All these measures improve the regularity of the sowing of the seeds almost to the accuracy which was attained in experiments with a strip of loam as underlay. The field germination properties were considerably increased, which is an important prerequisite for the following machine separation or the sowing at a greater distance apart. A conventional scraper is attached to the back of the last roller, which scraper scrapes off the loose crumbly layer above the pressed down strip which slows down the drying out or the elution of the strip.

I claim:

1. In a vehicle driven machine for drilling individual seeds, a drill coulter forming a wedge-shaped groove, a lever supporting said drill coulter at one point, and adapted to be connected to a towing vehicle at another point, and a follower behind said drill coulter, consisting of three, substantially separate coaxial rollers, including two flexible coaxial rollers of conical shape with their outer diameter decreasing from the inner face to the outer face, and arranged spaced from each other so as to be flexibly supported on the side walls of said groove; the width of each of said conical rollers being substantially larger than the space between them; and a third roller of substantially larger diameter than the inner face diameter of said conical rollers, and arranged in the space between said conical rollers so as to press down the seed into said groove while said conical rollers are supported on its side walls.